(12) United States Patent
Sarkisian et al.

(10) Patent No.: US 10,144,830 B2
(45) Date of Patent: Dec. 4, 2018

(54) PRETREATMENT FLUIDS WITH AMMONIUM METAL CHELATE CROSS-LINKER FOR PRINTING MEDIA

(75) Inventors: George Sarkisian, San Diego, CA (US); Ali Emamjomeh, San Diego, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 350 days.

(21) Appl. No.: 14/356,937

(22) PCT Filed: Dec. 19, 2011

(86) PCT No.: PCT/US2011/065850
§ 371 (c)(1),
(2), (4) Date: May 8, 2014

(87) PCT Pub. No.: WO2013/095332
PCT Pub. Date: Jun. 27, 2013

(65) Prior Publication Data
US 2014/0308447 A1    Oct. 16, 2014

(51) Int. Cl.
| C09D 5/00 | (2006.01) |
| B41M 5/00 | (2006.01) |
| C09D 11/322 | (2014.01) |
| C09D 11/40 | (2014.01) |
| C09D 11/54 | (2014.01) |

(52) U.S. Cl.
CPC .......... *C09D 5/002* (2013.01); *B41M 5/0011* (2013.01); *B41M 5/0047* (2013.01); *B41M 5/0064* (2013.01); *C09D 11/322* (2013.01); *C09D 11/40* (2013.01); *C09D 11/54* (2013.01)

(58) Field of Classification Search
CPC ............................... C09D 5/002; C09D 11/54
See application file for complete search history.

(56) References Cited

U.S. PATENT DOCUMENTS

| 5,468,532 A * | 11/1995 | Ho ........................... B44C 1/17 |
| | | 428/334 |
| 5,886,071 A | 3/1999 | Hariharan |
| 6,123,760 A | 9/2000 | Varnell |
| 6,786,588 B2 | 9/2004 | Koyano et al. |
| 6,908,185 B2 | 6/2005 | Chen et al. |
| 7,335,699 B2 | 2/2008 | Dziwok et al. |
| 7,563,842 B2 | 7/2009 | Ma et al. |
| 7,572,326 B2 | 8/2009 | Choy et al. |
| 7,677,714 B2 | 3/2010 | Sarkisian et al. |

(Continued)

FOREIGN PATENT DOCUMENTS

| JP | 2009-299240 | 12/2009 |
| WO | WO 2008/052962 A1 | 5/2008 |

(Continued)

OTHER PUBLICATIONS

Covestro Dispersions (Year: 2017).*

(Continued)

*Primary Examiner* — Xiao S Zhao
(74) *Attorney, Agent, or Firm* — Dierker & Kavanaugh PC

(57) ABSTRACT

A pretreatment fluid for printing media with a pigment ink composition includes a liquid vehicle, at least one polymeric binder having pendant carboxyl groups, and an ammonium metal chelate cross-linker.

20 Claims, 3 Drawing Sheets

(56) References Cited

U.S. PATENT DOCUMENTS

| | | |
|---|---|---|
| 7,722,179 B2 | 5/2010 | Mubarekyan et al. |
| 7,728,062 B2 | 6/2010 | Ma et al. |
| 7,744,205 B2 | 6/2010 | Sarkisian et al. |
| 2003/0018139 A1 | 1/2003 | Williams et al. |
| 2003/0148047 A1 | 8/2003 | Shepherd |
| 2004/0072003 A1* | 4/2004 | Choi .................. C09J 123/0853 428/522 |
| 2005/0209363 A1* | 9/2005 | Rehman ............... C09D 11/324 523/160 |
| 2006/0010619 A1 | 1/2006 | Hees et al. |
| 2006/0057339 A1 | 3/2006 | Adachi et al. |
| 2006/0147658 A1 | 7/2006 | Olijve et al. |
| 2008/0041003 A1 | 2/2008 | Nowak et al. |
| 2008/0057230 A1 | 3/2008 | Read et al. |
| 2009/0191383 A1 | 7/2009 | Kluge et al. |
| 2009/0219330 A1 | 9/2009 | Kiyomoto et al. |
| 2009/0233065 A1 | 9/2009 | Komatsu |
| 2010/0080910 A1 | 4/2010 | Okada |
| 2010/0231671 A1 | 9/2010 | Anton et al. |
| 2011/0032303 A1 | 2/2011 | Li |
| 2011/0039115 A1 | 2/2011 | Domes et al. |
| 2011/0076486 A1* | 3/2011 | McGee ..................... B32B 7/12 428/336 |
| 2011/0200799 A1 | 8/2011 | Mukai et al. |
| 2012/0121897 A1* | 5/2012 | Kim ....................... C09J 133/06 428/336 |

FOREIGN PATENT DOCUMENTS

| | | |
|---|---|---|
| WO | WO 2011/021591 A1 | 2/2011 |
| WO | WO-2012/170036 | 12/2012 |
| WO | WO-2013/025210 | 2/2013 |

OTHER PUBLICATIONS

International Search Report completed Jul. 27, 2012, dated Aug. 1, 2012 by Authorized Officer Jun Hak Kim of International Application No. PCT/US2011/065850, Filed Dec. 19, 2011; International Publication No. WO 2013/095332 A1 Published Jun. 27, 2013; 3 pgs.

Rheolate 255 information sheet, Copyright 2014 Elementis Specialties, Inc., 2 pages.

* cited by examiner

PRETREATMENT FLUIDS WITH AMMONIUM METAL CHELATE CROSS-LINKER FOR PRINTING MEDIA

BACKGROUND

Digital printing methods, such as inkjet printing with aqueous inks, can be used for the printing of solid surfaces and offer a number of potential benefits over other printing methods, such as transfer printing and screen printing. Aqueous inkjet inks are inherently safer than reactive UV inks and inks whose primary vehicle is a solvent. Inkjet printing furthermore allows visual effects, such as tonal gradients, that cannot be practically achieved with the other printing means for solid surfaces.

Both dyes and pigments have been used as colorants for inkjet inks and both have certain advantages. Pigment and disperse dye inks are advantageous because they tend to provide more water-fast and light-fast images than soluble dye inks. Aqueous pigment and disperse dye inks, however, do not readily adhere to solid media with low surface energies, such as solid plastic media, and when applied to solid plastic media can exhibit unsatisfactory durability, weatherability, and rubbing or scratch resistance.

Pretreatment fluids can be used to prime media before ink colorants are jetted on the media to provide bleed and coalescence control as well as improve adherence and durability. However, pretreatment fluids due not readily adhere to low-porous and non-porous media with low surface energies and can exhibit poor water and solvent durability that can be unsatisfactory.

DETAILED DESCRIPTION

Figure 1A:
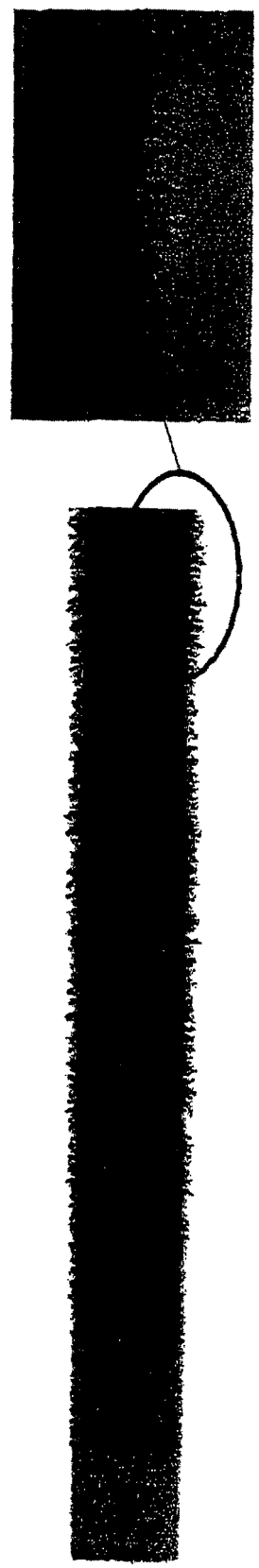
FIG. 1 illustrates images comparing bleed control and coalescence control of printed films formed on plastic substrates printed with: (A) a pigment inkjet composition after coating the substrate with a pretreatment fluid that is free of an ammonium metal chelate cross-linker; and (B) a pigment inkjet composition after coating the substrate with a pretreatment fluid that includes an ammonium metal chelate cross-linker.

Embodiments of this application relate to pretreatment fluids for recording media having a recording face formed of a low-porous or non-porous media, such as a low-porous or non-porous media that has a low surface energy (e.g., solid plastic media). The pretreatment fluid is applied on the low-porous or non-porous media prior to printing, e.g., inkjet recording, with a pigment ink composition. The pretreatment fluid readily adheres to the low-porous or non-porous media and when printed with a pigment ink composition, can prevent printed images from spreading and form glossy, durable recorded matters possessing enhanced rubbing resistance, scratch resistance, and water fastness.

The pretreatment fluid includes a liquid vehicle, at least one polymeric binder having pendant carboxyl groups, and an ammonium metal chelate cross-linker. The ammonium metal chelate cross-linker prior to heating or drying cannot readily cross-link the polymeric binder; however, the cross-linker upon heating or drying of the pretreatment fluid can generate metal ions by evaporation of the ammonium that can cross-link the polymeric binder in the pretreatment fluid as well as binders in a pigment ink composition that have pendant carboxyl groups. This cross-linking of the binders or polymers can increase the viscosity of the binders or polymers in the pretreatment fluid and pigment ink composition and restrict or mitigate ink or pigment migration in the pigment ink composition applied or printed on a pretreatment fluid coated low-porous or non-porous media.

The polymeric binder having pendant carboxyl groups can be any polymer, including any copolymer, that readily adheres to the low-porous or non-porous media and has a sufficient amount or number of pendant carboxyl groups to allow the polymer to be cross-linked upon heating or drying of the pretreatment fluid. The pendant carboxyl group can include carboxyl groups that are bound or provided anywhere on or within the chains or terminal ends of the polymer(s) that forms the polymeric binder. In some embodiments, the polymeric binder can include at least about 0.5% carboxyl groups by weight of the polymeric binder, at least about 1% carboxyl groups by weight of the polymeric binder, or at least about 5% carboxyl groups by weight of the polymeric binder.

The polymeric binder having pendant carboxyl groups can enhance the formation of a matrix on the low-porous or non-porous media, thereby facilitating adherence of pigments in the ink composition to the low-porous or non-porous media. In this aspect, the matrix can enhance the durability of an inkjet print on the low-porous or non-porous media.

In some embodiments, the polymeric binder having pendant carboxyl groups can be a water-soluble polymeric binder that readily adheres to low-porous and non-porous media, such as plastic media. For example, the polymeric binder having pendant carboxyl groups can be selected from group consisting of acrylic copolymers, such as styrene-(meth)acrylic acid copolymers having pendant carboxyl groups, acrylic polymers, such as polystyrene-acrylic polymers having pendant carboxyl groups, polyurethanes, salts thereof, and combinations thereof.

Examples of water-soluble polymeric binders having pendant carboxyl groups for use in the pretreatment fluid are water-soluble salts of polyurethane having pendant carboxyl groups, such as water-soluble amine salts of polyurethane having pendant carboxyl groups. Water-soluble amine salts of polyurethane having pendant carboxyl groups are commercially available and may be selected from the BAYHYDROL series polyurethanes, manufactured by Bayer Material Science AG, located in Leverkusen, Germany. In one example, the BAYHYDROL polyurethane can be BAYHYDROL UH 2606, which is an anionic, polycarbonate amine salt of polyurethane having pendant carboxyl groups. BAYHYDROL UH 2606 readily adheres to plastic substrates, is weatherable, and resistant to chemical degradation.

Other examples of water-soluble polymeric binders that have pendant carboxyl groups and that can be used in the pretreatment fluid include salts of styrene-(meth)acrylic acid copolymers that have pendant carboxyl groups. A salt of a styrene-(meth)acrylic acid copolymer having pendant carboxyl groups includes at least a styrene skeleton and a skeleton of the salt of the styrene-(meth)acrylic acid copolymer, such as a (meth)acrylate skeleton, in its structure. It also contains carboxyl groups attached to or within the acrylic or (meth)acrylate skeleton. Examples of styrene-(meth)acrylic acid copolymers having pendant carboxyl groups are commercially available and may be selected from the JONCRYL series acrylics (e.g., JONCRYL 538), manufactured by BASF, Corp. located in Florham Park, N.J.; SMA-1000Na and SMA-1440K, manufactured by Sartomer, located in Exton, Pa.; Disperbyk 190, manufactured by BYK Chemicals, located in Wallingford, Conn.; polystyrene-acrylic polymers manufactured by Gifu Shellac, located in Japan; or combinations thereof.

The pretreatment fluid can also include other polymeric binders that have pendant carboxyl groups or are free of pendant carboxyl groups as long as at least one polymeric binder used in the pretreatment fluid has pendant carboxyl groups that can be cross-linked by the ammonium metal chelate cross-linker. These other polymeric binders can include polyvinyl alcohol (including modified polyvinyl alcohols, such as carboxy-modified, itaconic-modified, maleic-modified, silica-modified or amino group-modified), methylcellulose, carboxy methylcellulose, starches (including modified starches), gelatin, rubber, casein, a styrene-maleic anhydride copolymer hydrolysate, polyacrylamide and saponified vinyl acetate-acrylic acid copolymer. Other examples of polymeric binders include latex type thermoplastic resins of synthetic polymers, such as styrene-butadiene copolymer, vinyl acetate copolymer, acrylonitrile-butadiene copolymer, methyl acrylate-butadiene copolymer or polyvinylidene chloride.

Still other examples of polymeric binders include thermoplastic polymers, such as polyolefins including polyethylene, polypropylene or polyvinyl chloride or mixtures thereof; polyamides and polyimides; polycarbonate, and polyesters, such as polyethylene terephthalate, known thermoplastic resins and latexes thereof, such as homopolymers made of α-methylene fatty acid monocarboxylic acid esters (e.g., methyl(meth)acrylate, ethyl(meth)acrylate, butyl (meth)acrylate, dodecyl(meth)acrylate, octyl(meth)acrylate or phenyl(meth)acrylate); styrenes, such as styrene, chlorostyrene or vinyl styrene; vinyl esters, such as vinyl acetate, vinyl propionate, vinyl succinate or vinyl butyrate; vinyl ethers, such as vinyl methyl ether, vinyl ethyl ether or vinyl butyl ether; or vinyl ketones, such as vinyl methyl ketone, vinyl hexyl ketone or vinyl isopropyl ketone, or copolymers containing the constitutional units.

Among the above-illustrated examples, homopolymers of α-methylene fatty acid monocarboxylic acid esters, such as methyl(meth)acrylate, ethyl(meth)acrylate, butyl(meth) acrylate, dodecyl(meth)acrylate, octyl(meth)acrylate or phenyl(meth)acrylate or copolymers containing these constituent units are acrylic resins.

Examples of latex include latex of thermoplastic resin, such as acrylic latex, acrylic silicone latex, acrylic epoxy latex, acrylic styrene latex, acrylic urethane latex, styrene-butadiene latex, acrylonitrile-butadiene latex, polyester urethane latex, and vinyl acetate latex. Among these, a thermoplastic resin or mixture of thermoplastic resins, such a urethane resin having pendant carboxyl groups and an acrylic resin having pendant carboxyl groups can be used where it is desirable to enhance the water-blocking properties.

In an embodiment, the pretreatment fluid can include at least one water-soluble polymeric binder having pendant carboxyl groups in an amount ranging from about 1% by weight to about 50% by weight of the pretreatment fluid. In another embodiment, the pretreatment fluid can include about 1% by weight to about 20% by weight of the pretreatment fluid water-soluble salt of styrene acrylic having pendant carboxyl groups and about 1% by weight to about 30% by weight of the pretreatment fluid water-soluble salt of polyurethane having pendant carboxyl groups, for example, about 5% by weight to about 10% by weight of the pretreatment fluid water-soluble salt of styrene acrylic having pendant carboxyl groups and about 10% by weight to about 20% by weight of the pretreatment fluid water-soluble salt of polyurethane having pendant carboxyl groups.

The ammonium metal chelate cross-linker includes a multivalent metal cation that complexes with an ammonium chelate and can be at least partially soluble in the liquid vehicle. Multivalent indicates an oxidation state of two more and can include for a metal "M", $M^{2+}$, $M^{3+}$, $M^{4+}$, and so forth. Examples of multivalent metal cations include metal cations of the following metals: Mg, Ca, Sr, Ba, Sc, Y, La, Ti, Zr, V, Cr, Mn, Fe, Ru, Co, Rh, Ni, Pd, Pt, Cu, Au, Zn, Al, Ga, In, Sb, Bi, Ge, Sn, and Pb. In some embodiment, the multivalent metal cation of the ammonium metal chelate cross-linker can be Zn or Zr.

The multivalent metal cation when not complexed to or free of the ammonium chelate in the pretreatment fluid can readily react with and cross-link carboxyl groups of the polymeric binder of the pretreatment fluid and carboxyl groups of polymers used in the pigment ink composition to mitigate or inhibit pigment migration (i.e., fix the ink pigment) and inhibit or control ink bleed. The multivalent metal is protected or inhibited in the pretreatment fluid from reacting with the carboxyl groups of the polymeric binder of the pretreatment fluid by the complexed ammonium chelate. Upon heating or drying of the pretreatment fluid, the ammonium can evaporate and release the multivalent metal, which upon release can react with and cross-link carboxyl groups of the polymeric binder of the pretreatment fluid and carboxyl groups of polymers used in the pigment ink composition. This allows the pretreatment fluid to be readily applied to the low-porous or non-porous media, mix with a pigment ink composition subsequently applied or printed to the pretreatment fluid coated low-porous or non-porous media, and then, upon heating or drying the mixture of the pigment ink composition and pretreatment fluid, cross-link the polymeric binders or polymers in the mixture having pendant carboxyl group. Cross-linking can be rapid enough to prevent pigment migration and inhibit bleed of the ink as well as improve durability of the printed film.

In some embodiments, the ammonium metal chelate cross-linker can be an ammonium zirconium carbonate cross-linker, an ammonium zinc carbonate cross-linker or mixture thereof. As shown in the schematic below, upon heating or drying the pretreatment fluid, ammonium zirconium carbonate generates ammonia, carbonate ions, and zirconium ions. The zirconium ions can cross-link polymeric binders in the pretreatment solution having pendant carboxyl groups or polymers in the pigment ink composition having pendant carboxyl groups.

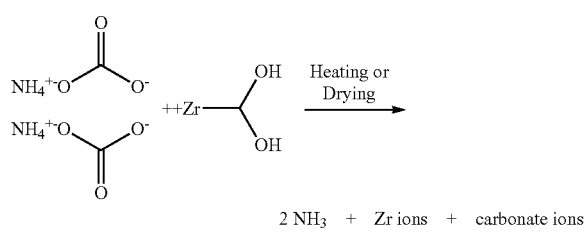

2 NH₃ + Zr ions + carbonate ions

Similarly, ammonium zinc carbonate upon heating or drying the pretreatment fluid can generate ammonia, carbonate ions, and zinc ions, which can cross-link polymeric binders in the pretreatment solution having pendant carboxyl groups or polymers in the pigment ink composition having pendant carboxyl groups.

An example of a commercially available zinc ammonium carbonate cross-linker is LIQUILINK 901, which is manufactured by Lubrizol Coatings, Ritterhude, Germany. An example of a zirconium ammonium carbonate is sold under the brand name EKA AZC 5880LN, which is manufactured by Eka Chemicals Inc., Moses Lake, Wash. Another example of an ammonium metal chelate cross-linker is titanium ammonium lactate.

Advantageously, the ammonium metal chelate cross-linker can be provided in the pretreatment fluid at amount effective to cross-link polymeric binders in the pretreatment fluid having pendant carboxyl groups or polymers in the pigment ink composition having pendant carboxyl groups as well as mitigate pigment migration upon printing of the pretreatment fluid. In an embodiment, the pretreatment fluid can include at least one ammonium metal chelate cross-linker in an amount ranging from about 0.1% by weight to about 2% by weight of the pretreatment fluid. In another embodiment, the pretreatment fluid can include about 0.1% by weight to about 1% by weight of the pretreatment fluid ammonium metal chelate cross-linker.

The liquid vehicle can include a solvent in which the polymeric binder and ammonium metal chelate cross-linker can be at least partially dissolved and which allows the polymeric binder and ammonium metal chelate cross-linker to be evenly coated on the surface of a low-porous or non-porous media, such as a plastic media or substrate. The liquid vehicle can be aqueous or non-aqueous. An aqueous vehicle refers to a vehicle that includes water or a mixture of water and at least one water-soluble organic solvent (co-solvent). Selection of a liquid vehicle mixture depends on requirements of the specific application, such as desired surface tension and viscosity, the selected pigment ink composition, and compatibility with the media onto which the pretreatment fluid and pigment ink composition are applied.

Examples of water-soluble organic solvents include alcohols, ketones, keto-alcohols, ethers and others, such as thiodiglycol, sulfolane, 2-pyrrolidone, 1,3-dimethyl-2-imidazolidinone and caprolactam, glycols, triols such as glycerol and 1,2,6-hexanetriol; lower alkyl ethers of polyhydric alcohols, urea and substituted ureas. An aqueous vehicle can contain about 30% to about 95% water with the balance (e.g., about 70% to about 5%) being the water-soluble solvent.

In some embodiments the pretreatment fluid can include a long-chain alkyl glycol ether to enhance the wettability to the low-porous or non-porous media. The long-chain alkyl glycol ether can include 5 to 8 alkyl chains, for example, 6 alkyl chains.

Examples of such a long-chain alkyl glycol ethers include ethylene glycol mono-n-pentyl ether, ethylene glycol mono-iso-pentyl ether, ethylene glycol mononeopentyl ether, ethylene glycol mono-n-hexyl ether, ethylene glycol mono-iso-hexyl ether, diethylene glycol mono-n-pentyl ether, diethylene glycol mono-iso-pentyl ether, diethylene glycol mononeopentyl ether, diethylene glycol mono-n-hexyl ether, diethylene glycol mono-iso-hexyl ether, triethylene glycol mono-n-pentyl ether, triethylene glycol mono-iso-pentyl ether, triethylene glycol mononeopentyl ether, triethylene glycol mono-n-hexyl ether, triethylene glycol mono-iso-hexyl ether, propylene glycol mono-n-pentyl ether, propylene glycol mono-iso-pentyl ether, propylene glycol mononeopentyl ether, propylene glycol mono-n-hexyl ether, propylene glycol mono-iso-hexyl ether, dipropylene glycol mono-n-pentyl ether, dipropylene glycol mono-iso-pentyl ether, dipropylene glycol mononeopentyl ether, dipropylene glycol mono-n-hexyl ether, dipropylene glycol mono-iso-hexyl ether, tripropylene glycol mono-n-pentyl ether, tripropylene glycol mono-iso-pentyl ether, tripropylene glycol mononeopentyl ether, tripropylene glycol mono-n-hexyl ether, tripropylene glycol mono-iso-hexyl ether, diethylene glycol mono-2-ethylhexyl ether, triethylene glycol mono-2-ethylhexyl ether, and tetraethylene glycol mono-2-ethylhexyl ether. These glycol ethers may be used alone or in combination.

The glycol ether content in the pretreatment fluid can be about 0.1% by weight of the pretreatment fluid to about 15% by weight of the pretreatment fluid, for example, about 0.5% by weight to about 10% by weight or about 1% to about 5% by weight. If the long-chain alkyl glycol ether content is more than 15% by weight, the pretreatment fluid cannot easily dry when it is applied onto low-porous or non-porous media.

In other embodiments, the pretreatment fluid can include a surfactant. The surfactant can be any surfactant that in combination with the other components of the pretreatment fluid lowers the surface tension of the pretreatment fluid to less than the surface tension or energy of the surface of the low-porous or non-porous media to be coated with the pretreatment fluid. For example, the pretreatment fluid can have a surface tension of about 16 dynes/cm to about 30 dynes/cm, about 16 dynes/cm to less than about 25 dynes/cm, or about 16 dynes/cm to less than about 20 dynes/cm.

The amount of surfactant can be from about 0.05% by weight to about 5% by weight of the pretreatment fluid, for example, about 0.25% by weight to about 2% by weight of the pretreatment fluid. The weight of the surfactant is the as received weight from the commercial supplier and may contain some organic solvent components and/or water.

It is believed that the surfactant facilitates even distribution of the pretreatment fluid on the low-porous or non-porous media. The even distribution leads to excellent color and optical density in the printed image; little if any bleed between the ink components; and sufficient adhesion for the printed image to be retained on the surface of the low-porous or non-porous media.

While any surfactant that meets the surface tension limitations can be chosen, in some embodiments the surfactant can be chosen from surfactants that have strong reduction of surface tension. Examples of these types of surfactants include fluorosurfactants and siloxane surfactants. Non-limiting examples of the fluorosurfactants include ZONYL Fluorosurfactants supplied by E.I. du Pont de Nemours and Company, Wilmington, Del., FLUORAD surfactants supplied by 3M Company, Minneapolis, Minn., and Dynax surfactants, supplied by Dynax Corp.

Other examples of surfactants that have strong reduction in surface tension are siloxane surfactants. Examples of commercially available siloxane surfactants include BYKs and Silwets from BykChemie, Wallingford, Conn. and Momentive Performance Materials, Wilton, Conn., respectively.

Still other candidate classes of surfactants include sulfonated surfactants and nonionic surfactants. These include but are not limited to alkali metal and ammonium salts of ethoxylated alkyl sulfates; alkali metal salts and ammonium salts of alky sulfates, alkyl aryl sulfonates, alkylated benzene sulfonates; alkali metal and ammonium salts of ethoxylated straight chain primary and aliphatic secondary alcohols; amphoteric surfactants and nonionic surfactants, such as ethoxylated alkylphenols, alkanol amides and amine oxides.

The pretreatment fluid may further contain other additives, such as a preservative, solubilizing agent, antioxidant, biocide, electric conductivity modifier, viscosity modifier, surface tension modifier, and oxygen absorbent. Examples of the preservative include sodium benzoate, sodium pentachlorophenol, sodium 2-pyridinethiol-1-oxide, sodium sorbate, sodium dehydroacetate, and 1,2-dibenzinethiazoline-3-one (Proxel CRL, Proxel BND, Proxel GXL, Proxel XL-2, and Proxel TN available from Arch Chemicals, Atlanta, Ga.).

Examples of a solubilizing agent include alcohols, such as ethanol, propanol, and butanol; amines, such as diethanolamine and morpholine, and their modified products; inorganic hydroxides, such as potassium hydroxide, sodium hydroxide, and lithium hydroxide; ammonium hydroxide and quarternary ammonium hydroxides (for example, tetramethylammonium hydroxide); carbonates, such as potassium carbonate, sodium carbonate, and lithium carbonate, and their salts; ureas, such as N-methyl-2-pyrrolidone, 2-pyrrolidone, urea, thio urea, and tetramethyl urea; allophanates, such as allophanate and methyl allophanate; biurets, such as biuret, dimethyl biuret, and tetramethyl biuret; and L-ascorbic acid and its salts.

The pretreatment liquid may further contain an antioxidant, such as Tinuvins (328, 900, 1130, 384, 292, 123, 144, 622, 770, and 292), Irgacors (252 and 153), and Irganoxs (1010, 1076, 1035, and MD 1024) produced by CIBA Specialty Chemicals; and lanthanide oxide.

The pretreatment fluid may be prepared by mixing the above ingredients together in any order to dissolve (or disperse) them and if necessary removing impurities and the like by filtration. The viscosity of the pretreatment fluid should be such that the pretreatment fluid can be readily applied or coated on the low-porous or non-porous media and once applied readily mix with a pigment ink composition that is printed on the coated low-porous or non-porous media. In some embodiments, the pretreatment fluid can have a viscosity of about 10 to about 1000 cps, for example, about 10 cps to less than about 900 cps, about 10 cps to less than about 800 cps, about 10 cps to less than about 700 cps, or about 10 cps to less than about 600 cps.

The pretreatment fluid can be applied to or coated on a recording face of the low-porous or non-porous media. The low-porous or non-porous media can have a solid surface and include media that does not absorb, wick or is penetrated by substantial amounts of the pretreatment fluid or ink compositions described herein. Examples of low-porous and non-porous media include plastics, vinyl coated wall coatings, polymeric/plastic sheets, such as polyvinylbutyral, TYVEK, plastic sheets using, as a base material, polyethylene terephthalate, polycarbonate, polypropylene, polyethylene, polysulfone, ABS resin, and polyvinyl chloride, recording media prepared by coating a metal, for example, by vapor deposition, onto the surface of metals, such as brass, iron, aluminum, SUS, and copper, or non-metallic substrates, recording media prepared by subjecting paper as a substrate, for example, to water repellency-imparting treatment, recording media prepared by subjecting the surface of fibers, such as cloth, for example, to water repellency-imparting treatment, and recording media formed of ceramic materials, prepared by firing inorganic materials at a high temperature, metals, glass, stone, wood, brick, tile, transparencies and paper, which is hydrophobic because it is either highly calendered and/or coated with hydrophilic coatings or paper, which has been processed for commercial offset printing. Included in the non-porous or low porous media includes media that would not readily absorb any of the pretreatment fluid or pigment ink composition.

In some embodiments the low-porous media or non-porous media has a low surface energy, such as a surface energy less than 100 $mJ/m^2$, less than about 50 $mJ/m^2$, or about 20 $mJ/m^2$ to about 50 $mJ/m^2$. Examples of low-porous or non-porous media with a low surface energy can include polymeric or plastic films, polymeric or plastic sheets, rigid plastic substrates, such as a rigid plastic substrates used in signage.

The pretreatment fluid may be applied or coated on the plastic media by any method without particular limitation. Examples of coating methods include brush coating, or contact-type coating using a conventional coating device, such as an air knife coater, a roll coater, a bar coater, a blade coater, a slide hopper coater, a gravure coater, a flexogravure coater, a curtain coater, an extrusion coater, a floating knife coater, a Komma coater, a die coater, gate roll coater, or a size press.

Other coating methods include non-contact-type coating using a spray, an inkjet head, a jet nozzle or the like wherein the pretreatment fluid is applied by spraying on the recording face of the low-porous or non-porous media. Spraying can be limited to the printed area of the low-porous or non-porous media. An example of where this limited spraying would be particularly applicable is in the digital inkjet printing of an image on preformed plastic media article, such as outdoor plastic signage.

After coating the pretreatment fluid on the low-porous or non-porous media and while the pretreatment fluid is still wet, a pigment ink composition is deposited or printed on the wet pretreatment fluid coated low-porous or non-porous media. In some embodiments, the pigment ink composition is deposited by an inkjet recording technique. An example of an inkjet recording technique includes drop-on-demand inkjet printing, which encompasses thermal and piezoelectric inkjet printing. Examples of printers include portable drop-on-demand inkjet printers (e.g., handheld printers, arm mountable printers, wrist mountable printers, etc.), desktop drop-on-demand inkjet printers, page wide array drop-on-demand printers/copiers, high-speed production printers, or combinations thereof.

Pigment ink compositions, such as pigment inkjet inks, that are deposited or printed on the coated low-porous or non-porous media can include a pigment that is dissolved or dispersed in an ink vehicle. In one example, the pigments are not self-dispersing, and a dispersing aid may be added to the vehicle. In another example, the pigment may be self-dispersible and modified to include at least one polymer chemically attached thereto. The use of self-dispersed pigments comprising a pigment having a dispersant polymer physically attached or chemically tethered thereto can provide good results with respect to dry time and durability. Examples of such physical attachment or chemical tethering can be through hydrophobic-hydrophilic attraction, ionic association, covalent bonding, physical adsorption, or other attachment mechanisms.

The pigment can be of any color, and the embodiments described herein are not limited to specific pigments. Further, the pigments can be neutral, cationic, anionic, and/or hydrophobic.

The ink vehicle comprises the balance of the pigment ink composition and can include a solution or dispersion in which the pigments are dispersed or dissolved. Examples of components for the ink vehicle include polymers, surfactants, solvents, co-solvents, buffers, biocides, sequestering agents, viscosity modifiers, surface-active agents, chelating agents, resins, and/or water, and/or combinations thereof.

Examples of solvents for the ink vehicle include glycerol polyoxyethyl ether, tripropylene glycol, tetraethylene glycol, 1-(2-hydroxyethyl)-2-imidazolidinone, 1-(2-hydroxyethyl)-2-pyrrolidone, 1,6-hexanediol, 1,2,6-hexanetriol, trimethylolpropane, dipropylene glycol, Dantocol DHE, Lonza, Inc. Fairlawn N.J., and/or combinations thereof. The amount and type of solvent used depends, at least in part, on the properties of the ink as well as the liquid vehicle of the pretreatment fluid. As such, the amounts may vary as desired.

The surfactants for the ink vehicle can be nonionic or anionic. Examples of nonionic surfactants include to ethoxylated alcohols, fluorinated surfactants, 2-diglycol surfactants, and/or combinations thereof. Specific examples of nonionic surfactants include surfactants from the SURFYNOL series, manufactured by Air Products and Chemicals, Inc., Allentown, Pa., in addition to the surfactants described herein with respect to the pretreatment fluid.

Polymers for the ink vehicle can be water-soluble, and may advantageously include polymers with pendant carboxyl groups. Polymers with pendant carboxyl groups can be cross-linked by the ammonium metal chelate cross-linker when the pigment ink composition is applied to the pretreatment fluid coated low-porous or non-porous media and heated.

In some embodiments, a polymer with pendant carboxyl groups can selected from salts of styrene-(meth)acrylic acid copolymers having pendant carboxyl groups, polystyrene-acrylic polymers having pendant carboxyl groups, polyurethanes having pendant carboxyl groups, and/or other water-soluble polymeric binders, and/or combinations thereof. Examples of polyurethanes having pendant carboxyl groups include those that are commercially available from Dainippon Ink & Chem, Inc. (DIC), located in Osaka, Japan. Other examples of polymers having pendant carboxyl groups that can be used in the pigment ink composition are salts of styrene-(meth)acrylic acid copolymers having pendant carboxyl groups. Examples of styrene-(meth)acrylic acid copolymers having pendant carboxyl groups are commercially available and may be selected from the Joncryl series (e.g., Joncryl 586 and 683), manufactured by BASF, Corp. located in Florham Park, N.J.; SMA-1000Na and SMA-1440K, manufactured by Sartomer, located in Exton, Pa.; Disperbyk 190, manufactured by BYK Chemicals, located in Wallingford, Conn.; polystyrene-acrylic polymers manufactured by Gifu Shellac, located in Japan; or combinations thereof.

Printing or applying the pigment ink composition on or to the wet pretreatment fluid results in a film that includes a mixture of the pigment ink composition and pretreatment fluid. Heating or drying of the mixture causes the ammonium of the ammonium metal chelate cross-linker to evaporate and release the multivalent metal, which upon release can react with and cross-link carboxyl groups of the polymeric binder of the pretreatment fluid and carboxyl groups of polymers used in the pigment ink composition. The cross-linked binders and polymers can strengthen the internal structure of the printed film and can result in a smoother and thicker printed film that exhibits enhanced gloss and durability compared to printed films that are formed by printing an ink composition on a pretreatment fluid that does not include an ammonium metal chelate cross-linker as described herein. The evaporation of ammonium and cross-linking of the polymeric binder and polymers of the pretreatment fluid and pigment ink composition is also rapid enough to prevent pigment migration before the ink is completely dry and inhibit bleed of the ink.

The mixture of pretreatment fluid and pigment ink composition can be heated or dried during printing of the pigment ink composition by the printing means itself (e.g., heated print head and/or heated pigment ink composition) and/or by using heat drying means, for example, a heating device such as an infrared heating device or a hot air heating device. In some embodiments, drying can be carried out by heating with a heater or hot-air drying at a temperature of, for example, about 50° C. to about 65° C.

Upon drying the printed ink film of the ink composition and pretreatment fluid has enhanced adherence to the low-porous or non-porous media. The enhanced adhesion can substantially prevent the separation of the film caused, for example, by external force, such as friction or the entry of water into the interface, and thus can realize the formation of recorded matters possessing excellent durability including rubbing resistance, scratch resistance and water resistance.

Embodiments described herein also relate to methods for inkjet printing fast-drying durable images with enhanced bleed control and durability. Such methods can include the steps of at least partially coating low-porous or non-porous media, such as plastic media, with a pretreatment fluid described herein and then while the pretreatment fluid is still wet applying by, for example, inkjet printing, a pigment ink composition to the pretreatment fluid coated low-porous or non-porous media to form a mixture of the pigment ink composition and pretreatment fluid. The mixture so formed can be heated or dried during printing of the pigment ink composition to provide a durable, high resolution printed matter.

In another embodiment, an inkjet printed image on a low-porous or non-porous media can include a low-porous or non-porous media and a printed film formed from a pretreatment fluid and a pigment ink composition described herein. The pretreatment fluid can be applied to the low-porous or non-porous media. The pigment ink composition can upon printing mix with the pretreatment fluid and upon heating or drying form the printed film. The combination of the pigment ink composition and the pretreatment fluid on the low-porous or non-porous media can provide a fast-drying durable image.

Embodiments of this application are further illustrated by the following Examples that are not intended to limit the application.

Example 1

Pretreatment fluids were prepared using different formulations to test for bleed and coalescence control. The formulations and physical properties of the pretreatment fluids are listed in Table 1. Pretreatment fluid A was prepared as a control and did not include an ammonium metal chelate cross-linker; whereas pretreatment fluids B, C, D, E, and F included either ammonium zinc carbonate (LIQUILINK 901, Lubrizol Coatings, Ritterhude, Del.) or ammonium zirconium carbonate (EKA AZC 5880LN, EKA Chemicals, Moses Lake, Wash.).

| Ingredients % w/w Solids | Control - Poor Bleed A | Pretreat Formula Examples with good to excellent bleed control | | | | |
|---|---|---|---|---|---|---|
| | | B | C | D | E | F |
| PROGLYDE DMM | 3.0 | 3.0 | 3.0 | 3.0 | 3.0 | 3.0 |
| DOWANOL DPM | 2.0 | 2.0 | 2.0 | 2.0 | 2.0 | 2.0 |
| BYK-021 | 0.2 | 0.2 | 0.2 | 0.5 | 0.5 | 0.5 |
| DYNAXDX4000 | 0.9 | 0.9 | 0.9 | 0.9 | 0.9 | 0.9 |
| JONCRYL 538-A | 5.0 | 5.0 | 5.0 | 5.0 | 8.0 | 10.0 |
| BAYHYDROL UH 2606 | 10.0 | 10.0 | 10.0 | 10.0 | 15.0 | 20.0 |
| Tecylen F-16/50 wax | 4.0 | 4.0 | 4.0 | 4.0 | 4.0 | 4.0 |
| Byk-348* | 0.5 | 0.5 | 0.0 | 0.0 | 0.0 | 0.0 |
| LIQUILINK 901 | 0.0 | 0.5 | 0.5 | 0.0 | 0.6 | 0.6 |
| RayCryl 1240 | 0.0 | 10.0 | 0.0 | 0.0 | 0.0 | 0.0 |
| EKA AZC 5880LN | 0.0 | 0.0 | 0.0 | 0.6 | 0.0 | 0.0 |
| Water | Balance | Balance | Balance | Balance | Balance | Balance |
| Viscosity, cps | 14 | 38 | 25 | 8 | 296 | 292 |
| Surface Tension, d/cm | 20.83 | 18.08 | 16.78 | 19.81 | 17.91 | 17.95 |
| pH | 8.30 | 9.38 | 9.45 | 8.48 | 9.28 | 9.18 |

*Note:
Byk-348 does not affect bleed or surface tension when a strong fluorosurfactant is used (DX4000).
PROGLYDE DMM (dipropylene glycol dimethyl ether), Dow Chemical, Midland, MI.
DOWANOL DPM (dipropylene glycol methyl ether) Dow Chemical, Midland, MI.
BYK-021 (silicone defoamer), BYK USA Inc., Wallingford CT.
BYK-348 (silicone defoamer), BYK USA Inc., Wallingford CT.
DYNAX DX4000 (fluorosurfactant), Dynak Corporation, Pound Ridge, NY.
JONCRYL 538-A (styrene acrylic polymer), BASF Corporation, Florham, NJ.
BAYHYDROL UH 2606 (aliphatic, anionic urethane polymer), Bayer Material Science AG, Leverkusen, Germany.
Tecylen F-16/50 wax (Lubricant), Trüb Emulsions Chemie, Ramsen, Germany.
PROXEL GXL (biocide), Arch Chemicals, Inc. Atlanta, GA.
RAYCRYL 1240 (acrylic), Specialty Polymers, Inc., Woodborn, OR.
LIQUILINK 901 (ammonium zirconium carbonate), Lubrizol Coatings, Ritterhude, Germany.
EKA AZC 5880 LN (ammonium zinc carbonate), EKA Chemicals, Moses Lake, WA.

Pretreatment fluids A-F were coated on polystyrene substrates by roll coating the fluids on the substrates, printed with aqueous pigment inkjet compositions, and then dried in a thermostatic chamber to form printed films. All printed films that were prepared using a pretreatment fluid with an ammonium metal chelate cross-linker (i.e., pretreatment fluids B-E) exhibited improved bleed and coalescence control compared to a control pretreatment fluid that did not include an ammonium metal chelate cross-linker.

Example 2

Figure 1B:

FIG. 1 illustrates images comparing bleed control and coalescence control of duty patterns formed on plastic substrates printed with: (A) a pigment inkjet composition after coating the substrate with a pretreatment fluid (having the formulation A noted above) that is free of an ammonium metal chelate cross-linker (i.e., control formulation); and (B) a pigment inject composition after coating the substrate with a pretreatment fluid (having the formulation C noted above) that includes the ammonium metal chelate cross-linker, ammonium zinc carbonate. The images show the printed film (B) formed by inkjet printing the pigment ink composition over a wet pretreatment fluid that included the ammonium metal chelate cross-linker exhibited enhanced resolution and bleed control compared to the printed film (A) formed by inkjet printing the pigment inkjet composition over a pretreatment fluid that did not include an ammonium metal chelate cross-linker.

Example 3

Figure 2:
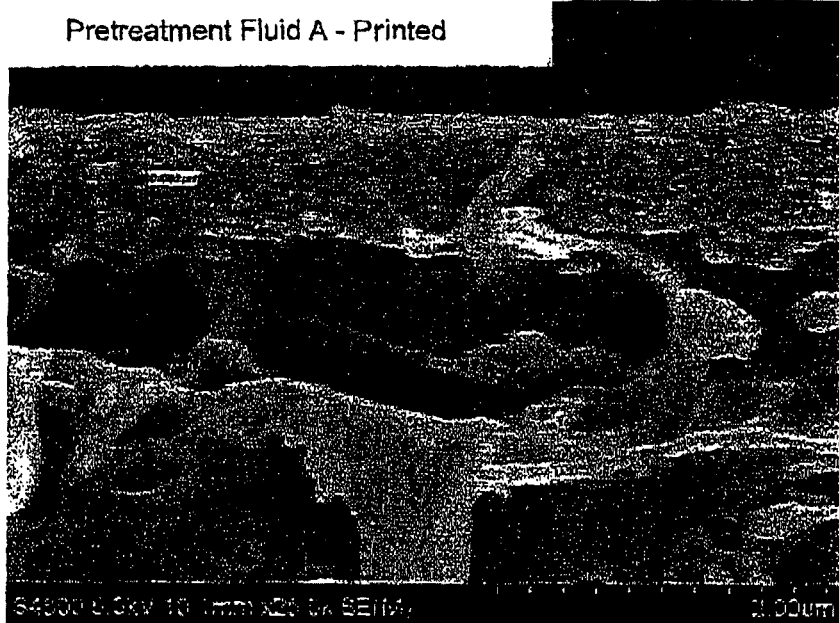
FIG. 2 illustrates images comparing thicknesses of printed films formed on plastic substrates printed with: (upper image) a pigment inkjet composition after coating the substrate with a pretreatment fluid that is free of an ammonium metal chelate cross-linker; and (lower image) a pigment inkjet composition after coating the substrate with a pretreatment fluid that includes an ammonium metal chelate cross-linker.
Figure 2:
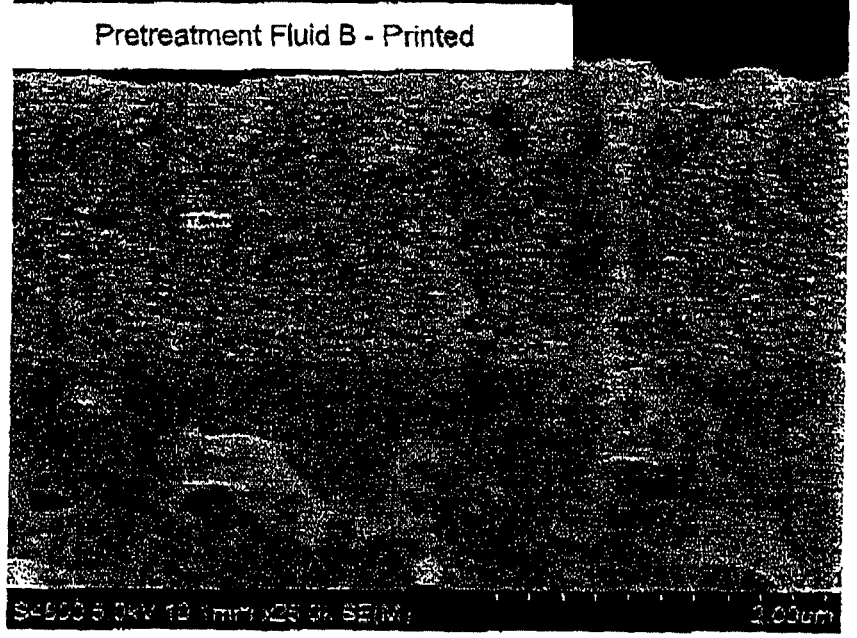

FIG. 2 illustrates images comparing the thickness of printed films formed on plastic substrates printed with: (upper image) a pigment inkjet composition after coating the substrate with a pretreatment fluid (having the formulation A noted above) that is free of an ammonium metal chelate cross-linker (i.e., control formulation); and (lower image) a pigment inject composition after coating the substrate with a pretreatment fluid (having the formulation C noted above) that includes the ammonium metal chelate cross-linker, ammonium zinc carbonate. The images show the printed film formed by inkjet printing the pigment ink composition over a wet pretreatment fluid that included the ammonium metal chelate cross-linker exhibited increased thickness compared to the printed film formed by inkjet printing the pigment inkjet composition over a pretreatment fluid that did not include an ammonium metal chelate cross-linker (0.7 µm for printed film formed with pretreatment fluid with no ammonium metal chelate cross-linker compared to 1.7 µm for printed film formed with pretreatment fluid including ammonium metal chelate cross-linker).

Example 4

Figure 3:
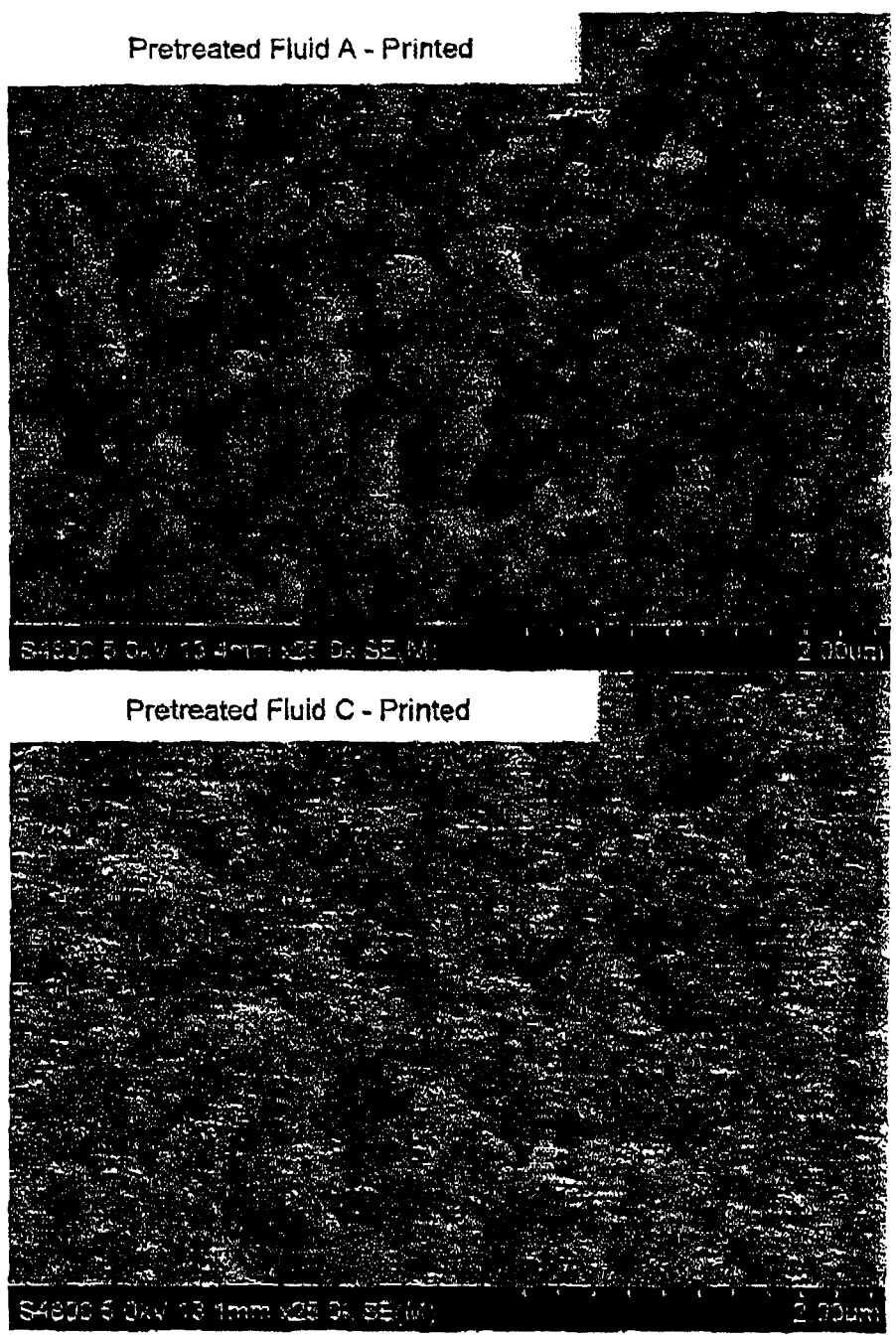
FIG. 3 illustrates images comparing the print surfaces of films formed on plastic substrates printed with: (upper image) a pigment inkjet composition after coating the substrate with a pretreatment fluid that is free of an ammonium metal chelate cross-linker; and (lower image) a pigment inkjet composition after coating the substrate with a pretreatment fluid that includes an ammonium metal chelate cross-linker.

FIG. 3 illustrates images comparing the print surface of printed films formed on plastic substrates printed with: (upper image) a pigment inkjet composition after coating the substrate with a pretreatment fluid (having the formulation A noted above) that is free of an ammonium metal chelate cross-linker (i.e., control formulation); and (lower image) a pigment inject composition after coating the substrate with a pretreatment fluid (having the formulation C noted above) that includes the ammonium metal chelate cross-linker, ammonium zinc carbonate. The images show the printed film formed by inkjet printing the pigment ink composition over a wet pretreatment fluid that included the ammonium metal chelate cross-linker exhibited were substantially smoother an included less large lumps to diffuse light and lower gloss compared to the printed film formed by inkjet printing the pigment inkjet composition over a pretreatment fluid that did not include an ammonium metal chelate cross-linker.

Example 5

A pretreatment fluid was prepared by mixing, by weight, 5% JONCRYL 538-A (BASF Corporation, Florham, N.J.), 5% BAYHYDROL US 2606 (Bayer Material Science AG, Leverkusen, Germany), 4% Tecylen F-16/50 wax (Trüb Emulsions Chemie, Ramsen, Del.), 3.0% PROGLYDE DM (Dow Chemical, Midland, Mich.), 2.0% DOWANOL DPM (Dow Chemical, Midland, Mich.), 0.2% BYK-0212 defoamer (BYK USA Inc., Wallingford Conn.), 0.5% LIQUILINK 901 (Lubrizol Coatings, Ritterhude, Germany), and the balance water. The pretreatment fluid was applied to various plastic substrates listed below, printed with a black pigment ink composition and dried. The abrasion mar resistances of the printed films were then measure in accordance with ASTM D6279 (Rub Abrasion Mar Resistance of High Gloss Coatings) using a commercially available Taber Industries abrasion tester. As shown below, all printed films on various substrate that were prepared using a pretreatment fluid, which included an ammonium metal chelate cross-linker, exhibited minimal pigment removal when tested, thus, demonstrating the enhanced adherence and durability of printed films formed using a pretreatment fluid that include an ammonium metal chelate cross-linker.

TABLE 2

| Substrate | Taber eraser rub |
|---|---|
| Flexible vinyl | Min pigment removed |
| Rigid PVC | Min pigment removed |
| Chloroplast, PP | Min pigment removed |
| Acrylic | Min pigment removed |
| Polycarbonate | Min pigment removed |

While several embodiments have been described in detail, it will be apparent that the disclosed embodiments can be modified. Therefore, the foregoing description is considered exemplary rather than limiting.

What is claimed is:

1. A pretreatment fluid for a pigment ink composition, the pretreatment fluid comprising:
a liquid vehicle including water, wherein the water is present in an amount of at least about 59% by weight, based on a total % by weight of the pretreatment fluid; about 1% by weight to about 30% by weight of at least one polymeric binder, based on a total % by weight of the pretreatment fluid, the at least one polymeric binder having pendant carboxyl groups, wherein the polymeric binder includes about 1% by weight to about 10% by weight of a water-soluble salt of styrene acrylic having pendant carboxyl groups and about 1% by weight to about 20% by weight of a water-soluble salt of polyurethane having pendant carboxyl groups based on the total % by weight of the pretreatment fluid; and
about 0.1% by weight to about 2% by weight of an ammonium metal chelate cross-linker, based on the total % by weight of the pretreatment fluid;
wherein the pretreatment fluid is to be applied on a recording medium under the pigment ink composition.

2. The pretreatment fluid of claim 1, wherein the pretreatment fluid has a viscosity of about 10 cps to about 1000 cps and a surface tension of about 16 dynes/cm to about 30 dynes/cm.

3. The pretreatment fluid of claim 1, wherein the ammonium metal chelate cross-linker is ammonium zinc carbonate, ammonium zirconium carbonate, or a mixture thereof.

4. The pretreatment fluid of claim 1, wherein the polymeric binder is selected from the group consisting of acrylic polymers, acrylic copolymers, polyurethanes, salts thereof, and combinations thereof.

5. The pretreatment fluid of claim 1, wherein the liquid vehicle is an aqueous liquid vehicle.

6. The pretreatment fluid of claim 1, wherein the liquid vehicle further comprising a water-soluble organic solvent.

7. The pretreatment fluid of claim 6 wherein the water-soluble organic solvent is selected from the group consisting of thiodiglycol, sulfolane, 2-pyrrolidone, 1,3-dimethyl-2-imidazolidinone, caprolactam, glycerol, 1,2,6-hexanetriol, lower alkyl ethers of polyhydric alcohols, urea, substituted ureas, and combinations thereof.

8. The pretreatment fluid of claim 6 wherein the water-soluble organic solvent is present in the pretreatment fluid in an amount ranging from 5% by weight to 70% by weight, based on the total % by weight of the liquid vehicle.

9. The pretreatment fluid of claim 1 wherein:
the water-soluble salt of styrene acrylic is a salt of a styrene-(meth)acrylic acid copolymer having pendant carboxyl groups; and
the water-soluble salt of polyurethane is an anionic, polycarbonate amine salt of polyurethane having pendant carboxyl groups.

10. The pretreatment fluid of claim 1 wherein the ammonium metal chelate cross-linker is present in an amount from about 0.1% by weight to about 1% by weight, based on the total % by weight of the pretreatment fluid.

11. The pretreatment fluid of claim 1 wherein the water is present in an amount of at least 63.9% by weight, based on a total % by weight of the pretreatment fluid.

12. An aqueous pretreatment fluid for an aqueous pigment ink composition, comprising:
an aqueous vehicle including water, wherein the water is present in an amount of at least about 59% by weight, based on a total % by weight of the pretreatment fluid;
about 1% by weight to about 30% by weight of at least one polymeric binder having pendant carboxyl groups, based on a total % by weight of the pretreatment fluid, the polymeric binder being selected from the group consisting of acrylic polymers, acrylic copolymers, polyurethanes, salts thereof, and combinations thereof, wherein the polymeric binder includes about 1% by weight to about 10% by weight of a water-soluble salt of styrene acrylic having pendant carboxyl groups and about 1% by weight to about 20% by weight of a water-soluble salt of polyurethane having pendant carboxyl groups based on the total % by weight of the pretreatment fluid; and about 0.1% by weight to about 1% by weight of an ammonium metal chelate cross-linker, based on the total % by weight of the pretreatment fluid;

wherein the pretreatment fluid is to be applied on a low-porous or nonporous medium under the aqueous pigment ink composition.

13. The pretreatment fluid of claim 12, wherein the ammonium metal chelate cross-linker is ammonium zinc carbonate, ammonium zirconium carbonate, or a mixture thereof.

14. A pretreatment fluid for a pigment ink composition, the pretreatment fluid consisting of:

a liquid vehicle;

about 1% by weight to about 50% by weight of at least one polymeric binder, based on a total % by weight of the pretreatment fluid, the at least one polymeric binder having pendant carboxyl groups, wherein the polymeric binder includes about 1% by weight to about 10% by weight of a water-soluble salt of styrene acrylic having pendant carboxyl groups and about 1% by weight to about 20% by weight of a water-soluble salt of polyurethane having pendant carboxyl groups based on the total % by weight of the pretreatment fluid;

about 0.1% by weight to about 2% by weight of an ammonium metal chelate cross-linker, based on the total % by weight of the pretreatment fluid; and optionally an additive selected from the group consisting of a long-chain alkyl glycol ether, a surfactant, a preservative, a solubilizing agent, an antioxidant, a biocide, an electric conductivity modifier, a viscosity modifier, a surface tension modifier, an oxygen absorbent, and combinations thereof;

wherein the pretreatment fluid is to be applied on a recording medium under the pigment ink composition.

15. A method of producing a printed image on low-porous or non-porous media, the method comprising:

applying to a low-porous or non-porous medium a pretreatment fluid, the pretreatment fluid comprising a liquid vehicle including water, wherein the water is present in an amount of at least about 59% by weight, based on a total % by weight of the pretreatment fluid, about 1% by weight to about 30% by weight of at least one polymeric binder, based on a total % by weight of the pretreatment fluid, the at least one polymeric binder having pendant carboxyl groups, wherein the polymeric binder includes about 1% by weight to about 10% by weight of a water-soluble salt or styrene acrylic having pendant carboxyl groups and about 1% by weight to about 20% by weight of a water-soluble salt or polyurethane having pendant carboxyl groups based on the total % by weight of the pretreatment fluid;

and about 0.1% by weight to about 2% by weight of an ammonium metal chelate cross-linker, based on the total % by weight of the pretreatment fluid;

applying a pigment ink composition to the pretreatment fluid applied to the low-porous or non-porous medium, the pretreatment fluid having a viscosity that allows mixing of the pigment ink composition with the pretreatment fluid; and heating or drying the mixture of the pretreatment fluid and the pigment ink composition.

16. The method of claim 15, wherein the heating or drying of the pretreatment fluid and the pigment ink composition inhibits pigment migration of the pigment ink composition printed on the pretreatment fluid coated low-porous or non-porous medium.

17. The method of claim 15, wherein the pigment ink composition includes a polymer with pendant carboxyl groups.

18. The method of claim 15, wherein the applying of the pigment ink composition is accomplished by inkjet printing and the inkjet printing heats the pretreatment fluid to facilitate cross-linking.

19. The method of claim 15, wherein the ammonium metal chelate cross-linker is ammonium zinc carbonate, ammonium zirconium carbonate, or a mixture thereof.

20. The method of claim 15, wherein the low-porous or non-porous medium is a plastic medium.

* * * * *

UNITED STATES PATENT AND TRADEMARK OFFICE
CERTIFICATE OF CORRECTION

PATENT NO. : 10,144,830 B2
APPLICATION NO. : 14/356937
DATED : December 4, 2018
INVENTOR(S) : George Sarkisian et al.

Page 1 of 1

It is certified that error appears in the above-identified patent and that said Letters Patent is hereby corrected as shown below:

In the Claims

In Column 14, Line 28, in Claim 6, delete "comprising" and insert -- comprises --, therefor.

In Column 16, Line 9, in Claim 15, delete "or" and insert -- of --, therefor.

In Column 16, Line 12, in Claim 15, delete "or" and insert -- of --, therefor.

Signed and Sealed this
Second Day of April, 2019

Andrei Iancu
*Director of the United States Patent and Trademark Office*